United States Patent
Boyle, III et al.

(10) Patent No.: US 6,419,270 B1
(45) Date of Patent: Jul. 16, 2002

(54) INTEGRATED STEERING COLUMN AND PEDAL MOUNTING SYSTEM

(75) Inventors: Walter J Boyle, III, Lake Orion; Derrick Dysart, Southfield; Robert N Maley, Fraser; Jeffrey L Stancavage, Chesterfield Township; Srinivas Reddy Malapati, Ypsilanti; Jeffrey C Bonser, Livonia, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/713,710

(22) Filed: Nov. 15, 2000

(51) Int. Cl.[7] .................................................. B62D 1/16
(52) U.S. Cl. ......................................... 280/779; 74/492
(58) Field of Search ................................ 280/775, 777, 280/779; 74/492

(56) References Cited

U.S. PATENT DOCUMENTS

| | | | |
|---|---|---|---|
| 3,599,757 A | | 8/1971 | Takamatsu .................. 188/1 C |
| 3,714,780 A | * | 2/1973 | Shellhause |
| 4,098,525 A | | 7/1978 | Schwanz et al. ............. 280/750 |
| 4,274,646 A | * | 6/1981 | Olligschlager et al. |
| 4,317,582 A | | 3/1982 | Cottin et al. ................. 280/751 |
| 4,662,237 A | * | 5/1987 | Kami et al. |
| 4,733,739 A | * | 3/1988 | Lorenz et al. |
| 4,893,834 A | | 1/1990 | Honda et al. ................ 280/751 |
| 5,082,078 A | * | 1/1992 | Umeda et al. |
| 5,088,571 A | * | 2/1992 | Burry et al. |
| 5,167,305 A | * | 12/1992 | Cadeddu |
| 5,549,327 A | | 8/1996 | Rusche ........................ 280/751 |
| 5,685,564 A | * | 11/1997 | Iijima et al. |

* cited by examiner

Primary Examiner—Brian L. Johnson
Assistant Examiner—Joselynn Y. Sliteris
(74) Attorney, Agent, or Firm—Ralph E. Smith

(57) ABSTRACT

An apparatus for use in a motor vehicle. The apparatus includes a lower mounting bracket and an upper mounting bracket. The upper mounting bracket is mounted between the lower mounting bracket and an instrument panel of the motor vehicle. A steering column is mounted to the lower mounting bracket. A brake pedal having a brake pedal shaft is coupled to the lower mounting bracket. A clutch pedal having a clutch pedal shaft is coupled to the lower mounting bracket.

10 Claims, 6 Drawing Sheets

INTEGRATED STEERING COLUMN AND PEDAL MOUNTING SYSTEM

BACKGROUND OF THE INVENTION

1. Field of the Invention

The present invention generally relates to motor vehicles. More particularly, the present invention relates to an integrated steering column and pedal mounting system for a motor vehicle.

2. Discussion

In conventional motor vehicles, instrument panels are generally equipped with either a cross-car tube or a steering column support bracket. Cross-car tubes typically include discrete bracketry to support the steering column, brake pedal, clutch pedal and brake switch. Similarly, separate bracketry is required in arrangements including a steering column support bracket for the brake pedals and brake switch.

While such conventional arrangements have proven to be suitable for their intended purposes, they are associated with disadvantages. In this regard, known arrangements do not integrally incorporate sufficient support in a vertical direction to prevent steering column rotation about a horizontal axis extending in a cross-car direction. Additionally, conventional arrangements require discrete bracketry to support the brake pedal, clutch pedal, and brake switch. These designs therefore require additional components and assembly operations. In addition, costs for design manufacturing are increased.

Thus, it remains a need in the relative art to provide an integrated steering column and pedal mounting support system which reduces the complexities of manufacturing and assembly of conventional support systems in current motor vehicles.

SUMMARY OF THE INVENTION

It is a general object of the present invention to provide an integrated steering column and pedal mounting system which reduces the complexity of manufacturing and assembly of conventional steering column support systems.

It is another object of the present invention to provide a subassembly which integrally includes sufficient support in a vertical direction to prevent steering column rotation about an horizontal axis extending in a cross-car direction.

It is another object of the present invention to provide a steering column support bracket subassembly in which operator pedals have common shafts and bushings, the shafts are seated in pockets defined in a mounting bracket, thereby eliminating extra brackets and fasteners required for assembly of pedals to the vehicle.

It is another object of the present invention to provide a subassembly for a motor vehicle including a common bracket for mounting a brake booster assembly, a brake pedal, and a brake switch to thereby maintain continuity of the brake cycle.

In one form, the present invention provides a subassembly for use in a motor vehicle. The subassembly includes a lower mounting bracket and an upper mounting bracket. The lower bracket includes a brake pedal support aperture and a clutch pedal support aperture. The upper mounting bracket is secured to the lower mounting bracket and connects the lower mounting bracket and an instrument panel of the motor vehicle. A steering column is mounted to the lower mounting bracket. A brake pedal having a brake pedal shaft is coupled to the lower mounting bracket. A clutch pedal having a clutch pedal shaft is coupled to the lower mounting bracket.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiments of the present invention is merely exemplary in nature and is in no way intended to limit the invention or its application or uses.

Figure 1:
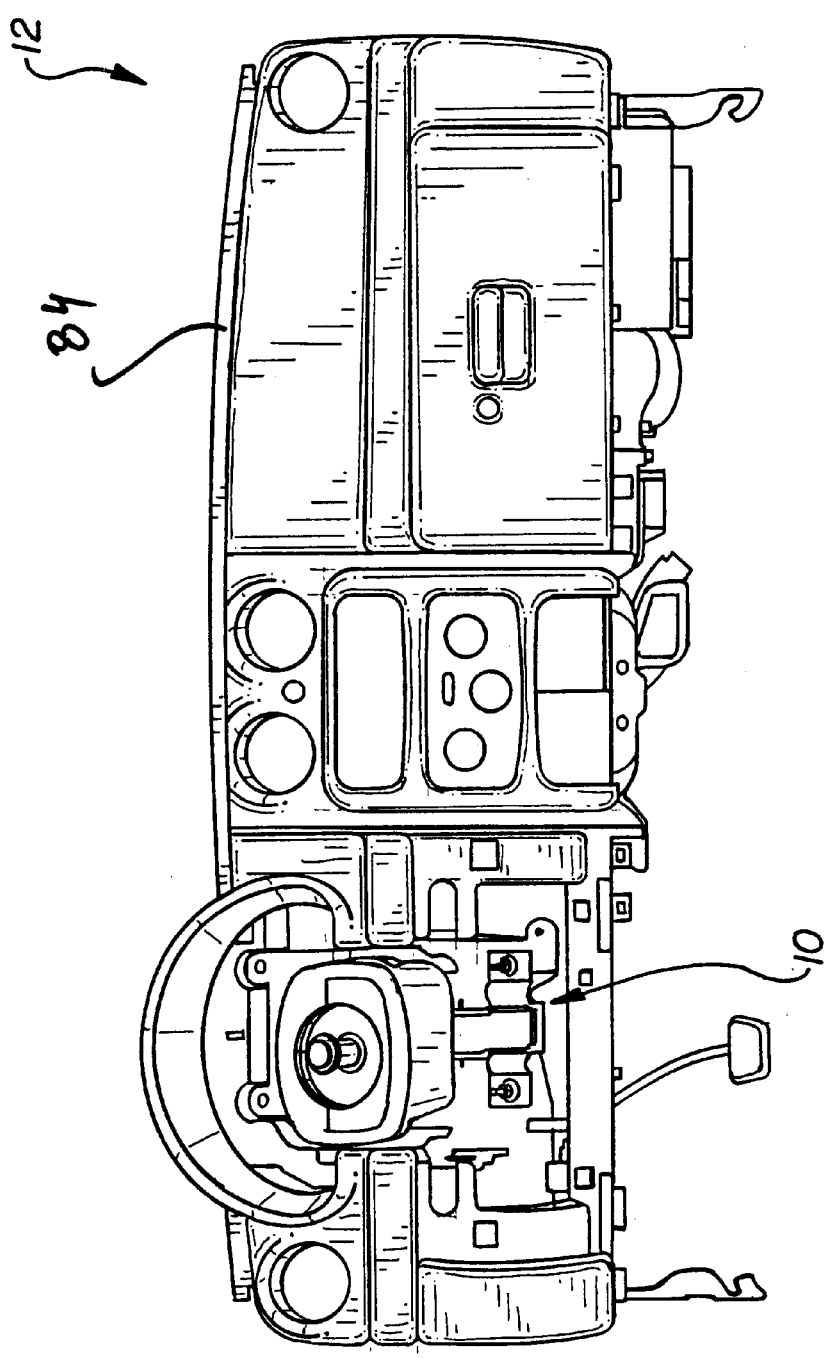
FIG. 1 is a front view of an instrument panel module incorporating a steering column support bracket subassembly constructed in accordance with the teachings of a preferred embodiment of the present invention.
Figure 2:
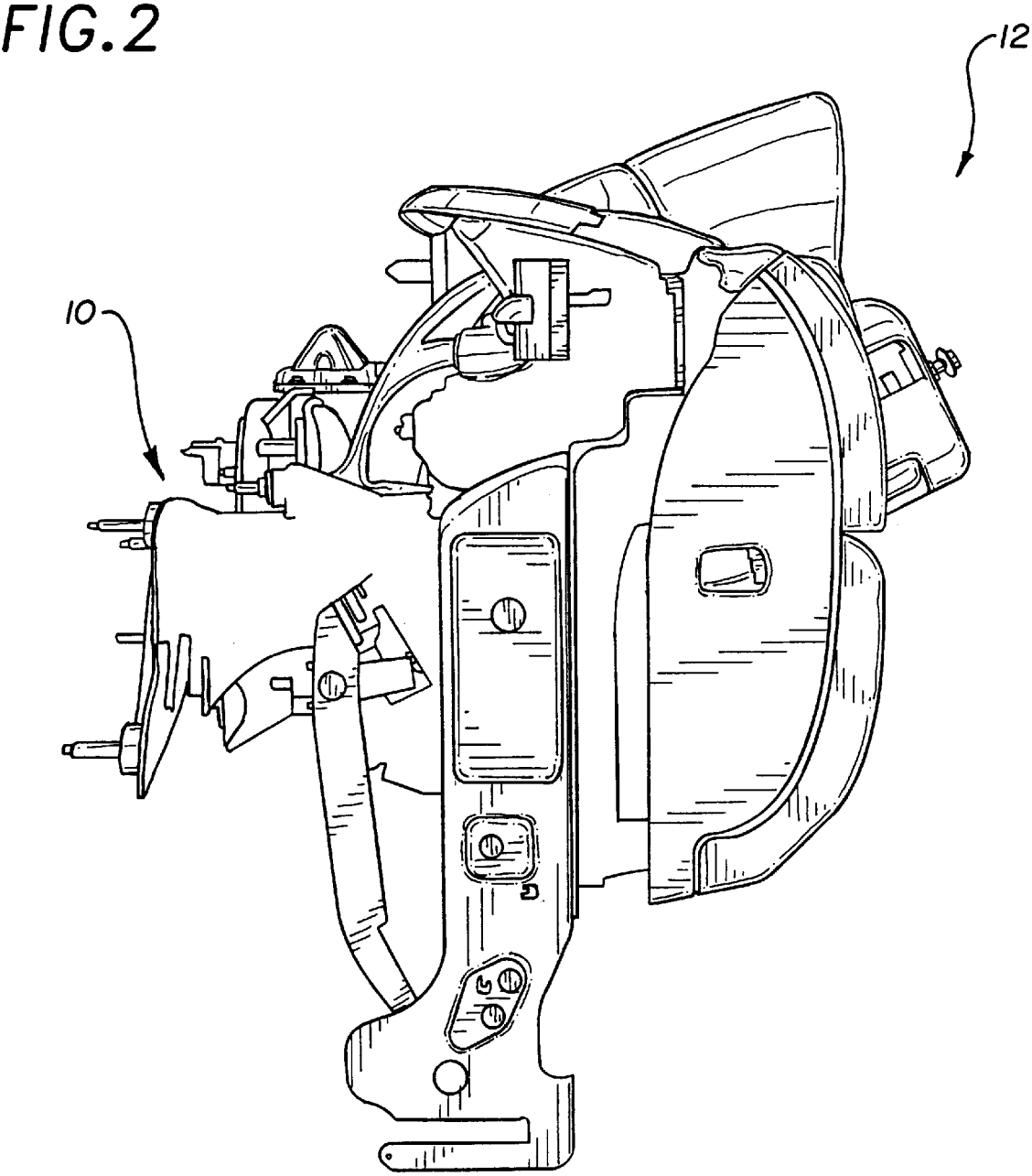
FIG. 2 is a side view of the instrument panel module of FIG. 1.
Figure 3:
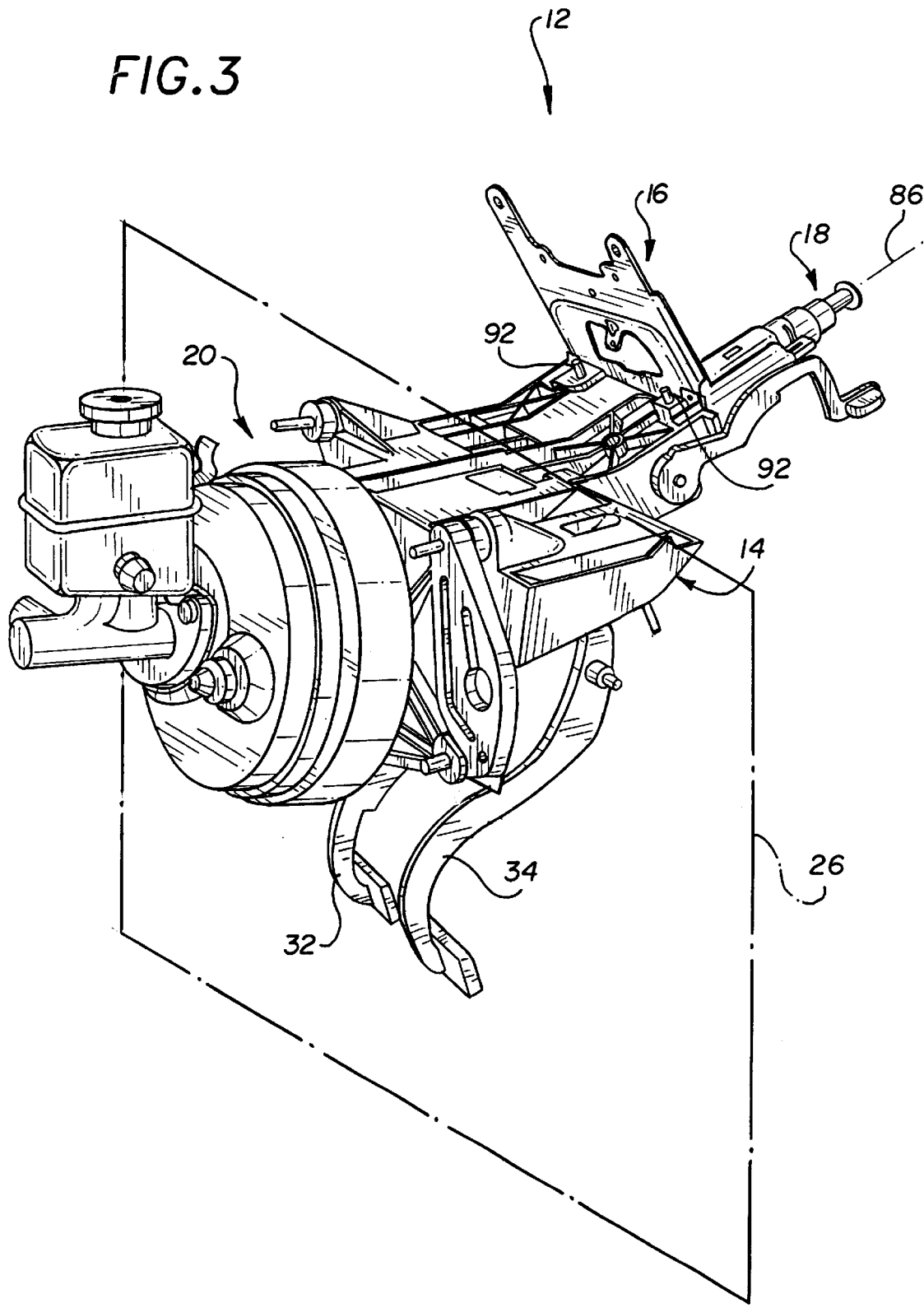
FIG. 3 is a rear and left side perspective view of the steering column support bracket subassembly of the present invention shown removed from the remainder of the instrument panel module for purposes of illustration.

With initial reference to FIGS. 1 and 2, a steering column support bracket subassembly constructed in accordance with the teachings of a preferred embodiment of the present invention is illustrated and generally identified at reference numeral 10. The subassembly 10 is shown operatively incorporated into an instrument panel module 12. It will be understood by those skilled in the art that the remainder of the instrument panel module 12 is conventional in construction insofar as the present invention is concerned.

With additional reference to FIGS. 1 and 2 and additional reference to FIGS. 3 through 8, the subassembly 10 of the present invention is illustrated to generally include a first or lower mounting bracket 14, a second or upper mounting bracket 16, a steering column 18, and a brake booster assembly 20. In the preferred embodiment, the lower mounting bracket 14 is preferably constructed of magnesium. However, alternate materials having suitable strength and durability requirements may be incorporated.

The lower mounting bracket 14 includes a substantially planar forward portion 24 which is secured to a rearwardly facing side of a firewall 26 (identified in FIG. 3 in phantom lines) of the motor vehicle. As illustrated, a plurality of fasteners 28 extend through the firewall 26. The planar portion 24 defines an opening 30 for receiving the brake booster assembly 20.

Figure 6:
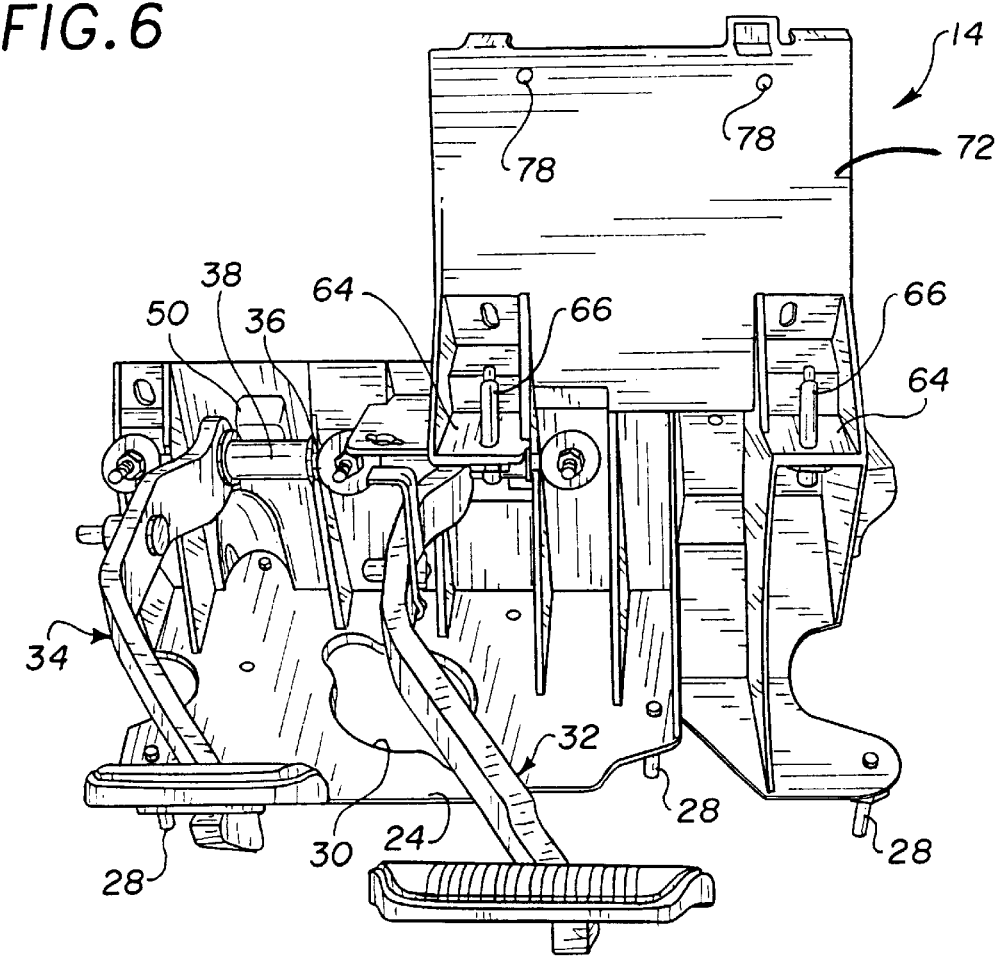
FIG. 6 is another perspective view of the lower bracket of FIG. 5.
Figure 7:
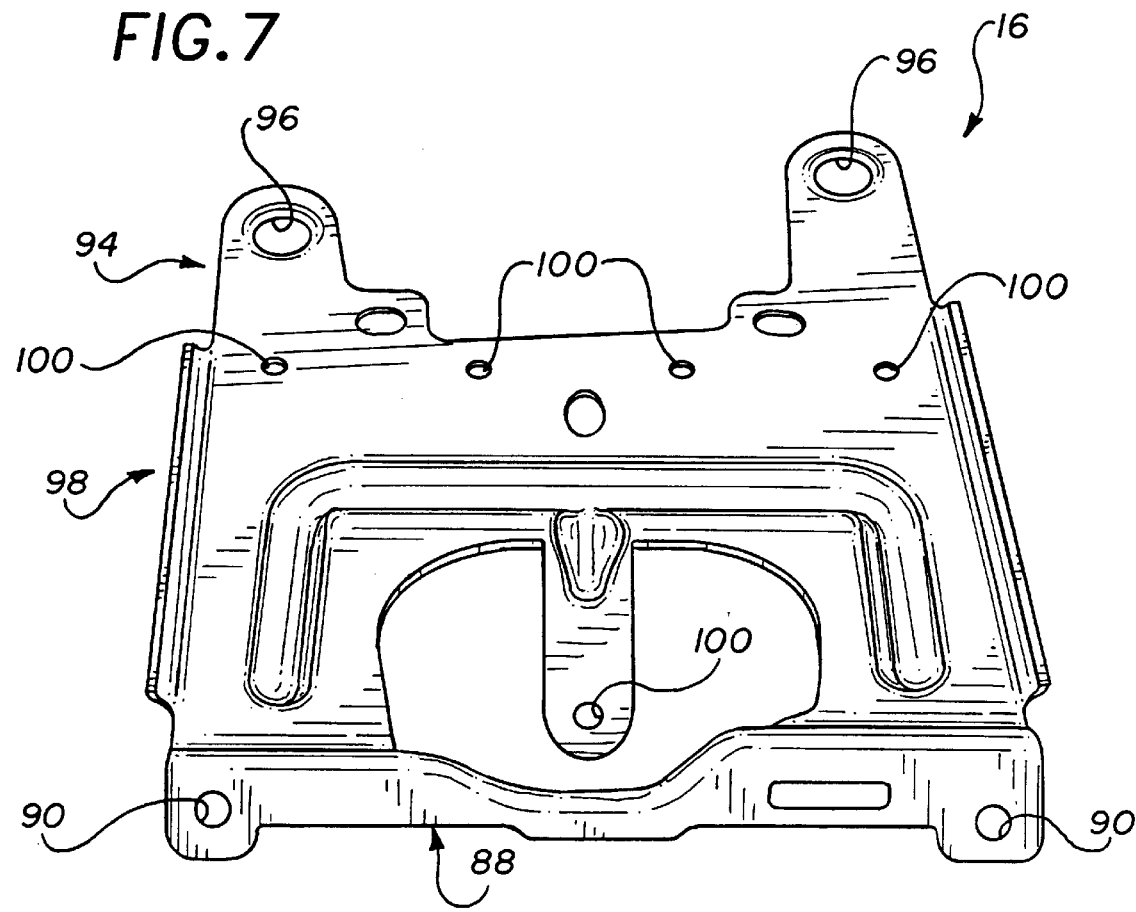
FIG. 7 is a perspective view of an upper bracket of the steering column support bracket of the subassembly of the present invention shown removed from the subassembly for purposes of illustration.
Figure 8:
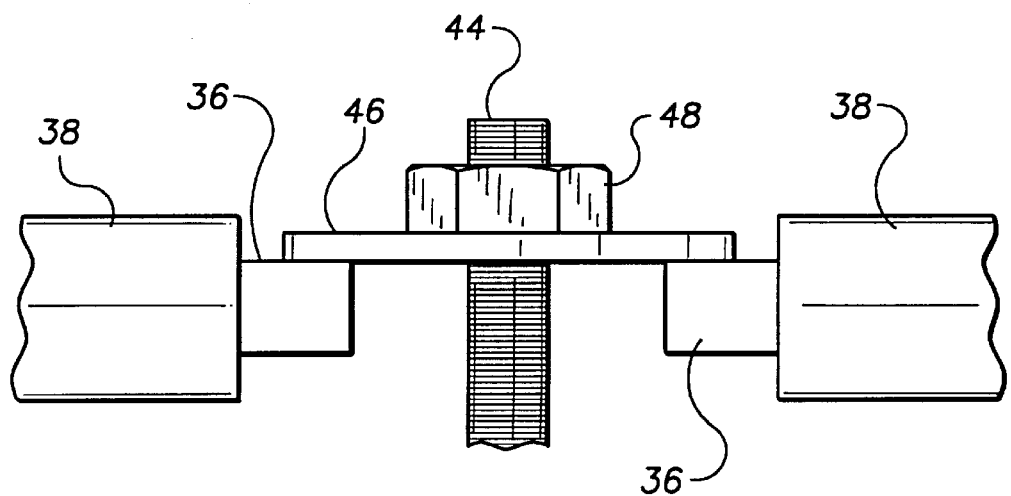
FIG. 8 is an enlarged view of a portion of the subassembly of the present invention.

As shown most particularly in FIG. 6, a brake pedal 32 and a clutch pedal 34 are both attached to the lower mounting bracket 14. The brake and clutch pedals 32 and 34 share common pivot shafts 36 and bushings 38. The brake pedal shaft 36 and the clutch pedal shaft 36 are shown coupled to the lower mounting bracket 14.

In the preferred embodiment, the lower mounting bracket 14 defines first and second pairs of pockets for receiving ends of the brake pedal and clutch pedal shafts 36, respectively. In the exemplary embodiment, the brake and clutch pedal shafts 36 are aligned. Threaded fasteners 44 extend from the lower mounting bracket 14 between the shafts 36 as well as adjacent the opposed ends of the shafts 36. Each of these threaded fasteners 44 receives a washer 46 and a nut 48 for retaining the respective shaft 36 in the associated pair of pockets 40 and 42. The center one of the threaded fasteners 44 and associated nut and washer 46 and 48 are illustrated in cross-section in FIG. 8. In this center position, a common washer and nut 46 and 48 are used to retain the adjacent ends of the shafts 36. The opposed ends of the shafts 36 are retained in a substantial identical manner.

The lower mounting bracket 14 is preferably configured to prevent improper attachment of the brake and clutch pedals 32 and 34 thereto. In this regard, a raised portion is integrally provided on the lower mounting bracket 14 between the pockets of the second pair of pockets 42. This raised portion 50 is intended to interfere with the arm of the brake pedal 32 if the brake pedal 32 is improperly positioned within the first pair of pockets 42. In this regard, the arm of the clutch pedal is offset from the center of the bushing 38 and thereby avoids any interference with the raised portion 50. In a similar manner, a tab 52 extends between the pockets of the first pair of pockets 40 and is intended to interfere with rotation of the arm of the clutch pedal if the clutch pedal is improperly attached. The manner of attachment of the brake and clutch pedals 32 and 34 to the lower mounting bracket eliminates extra brackets and fasteners which are typically required.

Figure 4:
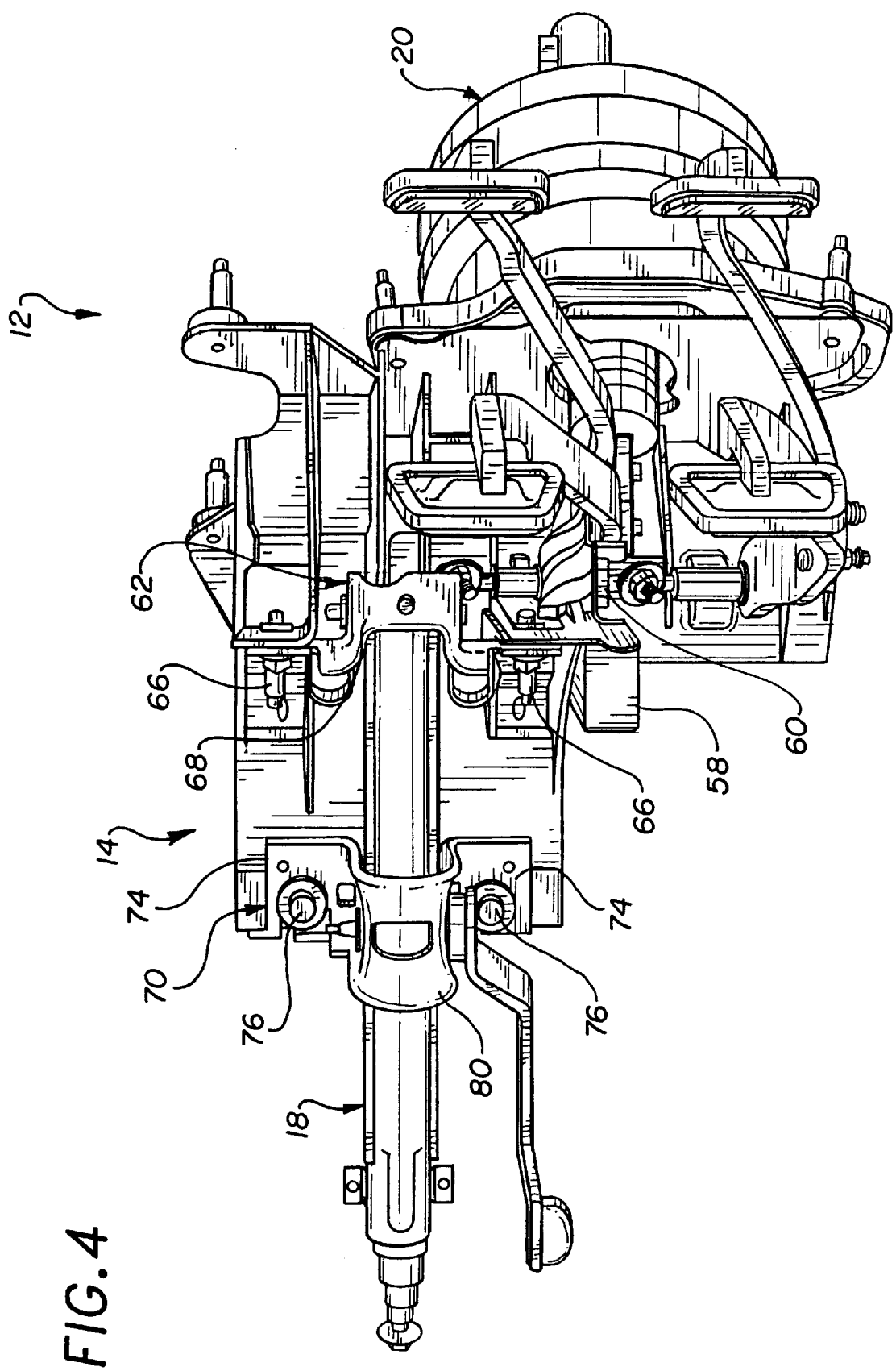
FIG. 4 is a bottom view of the steering column support bracket subassembly of the present invention.
Figure 5:
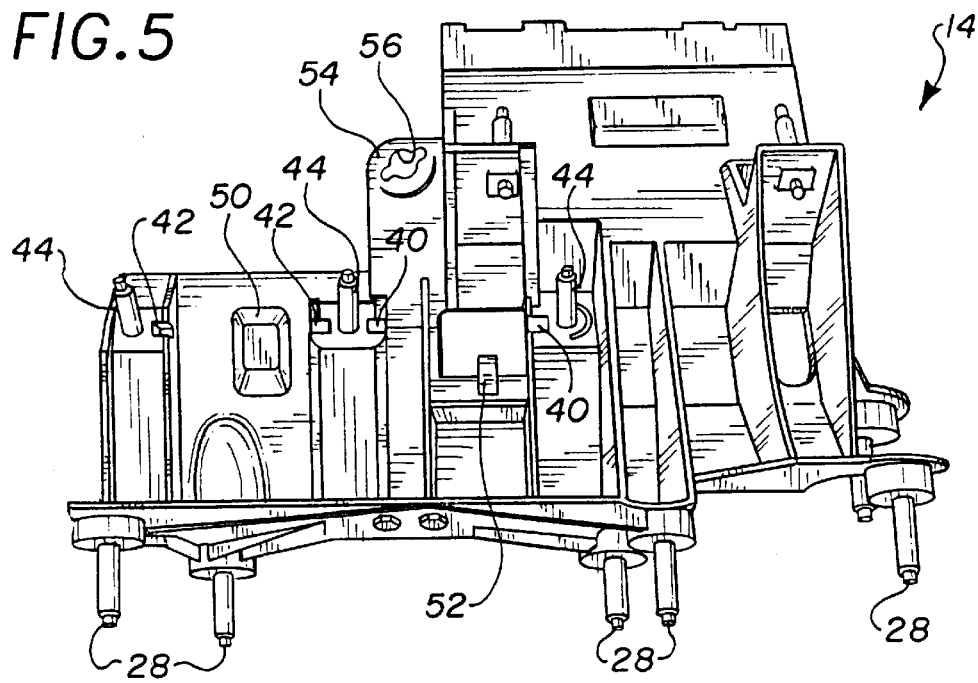
FIG. 5 is a perspective view of a lower bracket of the steering column support bracket of the subassembly of the present invention shown removed from the subassembly for purposes of illustration.

The lower mounting bracket 14 is further shown to include a flange 54 which defines an aperture 56 for receiving a brake switch 58 (shown particularly in FIG. 4). A switch flag 68 is carried by the brake pedal 32. Since the first pair of pockets 40 are cast into the lower mounting bracket 14 and the attachment of the brake switch 58 is defined, alignment of the brake switch 58 with the switch flag 60 and relative positioning with the brake booster 20 is defined. In this manner, continuity of the brake cycle is well maintained. The steering column 18 secured to the lower mounting bracket 14 at spaced apart points. As shown most particularly in FIG. 4, a first attachment member 62 secures a lower portion of the steering column to the lower mounting bracket 14. The first attachment 62 is secured to vertically extending mounting flanges 64 of the lower mounting bracket 14 with a pair of fasteners 66. A central portion 68 of the first attachment member 62 directly supports the steering column and prevents any downward movement of the lower end of the steering column 18.

A second attachment member 70 is secured to an upper planar portion 72 of the mounting member 14. The second attachment member 70 includes opposed ends 74 which are attached to the portion 72 with a pair of fasteners 76. The fasteners engage apertures 78 provided in the portion 72. A central portion 80 of the attachment member 70 directly supports the steering column 18. While the first and second attachment portions 62 and 70 are described as being secured to the lower mounting member 14 with fasteners 66 and 76, it will be understood that these attachment members 62 and 70 may alternatively be welded or otherwise suitably attached to the lower mounting bracket 14. In the preferred embodiment, the upper mounting bracket 16 is a steel stamping which interconnects the lower mounting bracket 14 with an instrument panel 84 of the vehicle. The upper mounting bracket 16 is illustrated to extend substantially perpendicular to a longitudinal axis 86 of the steering column 18. A lower portion 88 of the upper mounting bracket 16 defines a pair of apertures 90 for receiving fasteners 92 for securing the upper mounting bracket 16 to the lower mounting bracket 14. An upper portion 94 of the upper mounting bracket 16 defines a pair of apertures 96 for receiving fasteners (not particularly shown) for attachment to the body-in-white plenum. An intermediate portion 98 of the upper mounting bracket 16 similarly includes a plurality of apertures 100 for receiving fasteners (not particularly shown) for attachment of the upper mounting bracket 16 to a structural duct of the instrument panel.

The manner of attaching the steering column 18 to the vehicle described herein minimizes the steering column rotation and provides strength and stability to the steering wheel and column in off-road and normal driving conditions. As a result, additional bracketry otherwise required to prevent steering column rotation during a vehicle impact in an upward direction can be eliminated.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A subassembly for use in a motor vehicle, the subassembly comprising:

a lower mounting bracket;

an upper mounting bracket secured to the lower mounting bracket for attaching the lower mounting bracket and an instrument panel of the motor vehicle;

a steering column attached to the lower mounting bracket;

a brake pedal having a brake pedal shaft coupled to the lower mounting bracket;

a clutch pedal having a clutch pedal shaft coupled to the lower mounting bracket, wherein the lower mounting bracket integrally defines first and second pairs of pockets for receiving the brake pedal shaft and clutch pedal shaft, respectively; and a threaded shaft extending from the lower bracket between the brake and clutch pedal shafts and a common nut and a common washer surrounding the threaded shaft and retaining an adjacent end of both shafts against an associated pocket of the first and second pairs of pockets.

2. The subassembly of claim 1, wherein the steering column defines a longitudinally extending steering column axis and the upper mounting bracket extends from the lower mounting bracket in a direction generally perpendicular to the steering column axis.

3. The subassembly of claim 1, further comprising a brake booster assembly mounted to the lower mounting bracket.

4. The subassembly of claim 1, further comprising a brake switch mounted to the lower mounting bracket.

5. The subassembly of claim 1, further comprising first and second attachment members securing the steering column to the lower mounting bracket at spaced apart points.

6. A motor vehicle comprising:
- a fire wall extending in a cross-car direction;
- a first mounting bracket secured to a rearward facing side of the fire wall;
- a second mounting bracket interconnecting the first mounting bracket and an instrument panel;
- a steering column attached to the first mounting bracket;
- a brake pedal having a brake pedal shaft coupled to the first mounting bracket;
- a clutch pedal having a clutch pedal shaft coupled to the first mounting bracket, wherein the first mounting bracket integrally defines first and second pairs of pockets for receiving the brake pedal shaft and clutch pedal shaft, respectively; and
- a threaded shaft extending from the first bracket between the brake and clutch pedal shafts and a common nut and a common washer surrounding the threaded shaft and retaining an adjacent end of both shafts against an associated pocket of the first and second pairs of pockets.

7. The motor vehicle of claim 6, wherein the steering column defines a longitudinally extending steering column axis and the second mounting bracket extends from the first mounting bracket in a direction generally perpendicular to the steering column axis.

8. The motor vehicle of claim 6, wherein a brake booster assembly is disposed adjacent a forward facing side of the fire wall.

9. The motor vehicle of claim 6, further comprising a brake switch mounted to the first mounting bracket.

10. The motor vehicle of claim 6, further comprising first and second attachment members securing the steering column to the first mounting bracket at spaced apart points.

* * * * *